US012679452B2

(12) United States Patent
Nomoto et al.

(10) Patent No.: US 12,679,452 B2
(45) Date of Patent: Jul. 14, 2026

(54) OPERATION AMOUNT ACQUISITION DEVICE

(71) Applicant: TOYOTA JIDOSHA KABUSHIKI KAISHA, Toyota (JP)

(72) Inventors: Yotaro Nomoto, Toyota (JP); Shuji Fujita, Miyoshi (JP); Takeo Tanabe, Toyota (JP); Hiroki Eto, Okazaki (JP); Shohei Funahazama, Toyota (JP); Takahiro Iwahara, Toyota (JP); Keisuke Matsukura, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/924,162

(22) Filed: Oct. 23, 2024

(65) Prior Publication Data

US 2025/0171077 A1 May 29, 2025

(30) Foreign Application Priority Data

Nov. 23, 2023 (JP) ................................. 2023-198714

(51) Int. Cl.
*B62D 6/00* (2006.01)
*B62D 5/04* (2006.01)
(52) U.S. Cl.
CPC ............. *B62D 6/002* (2013.01); *B62D 5/046* (2013.01); *B62D 6/001* (2013.01)
(58) Field of Classification Search
CPC ........ B62D 6/002; B62D 5/046; B62D 6/001;
B62D 5/0481; B62D 15/0225; B62D 15/0235; B62D 7/159; B62D 15/0245; B62D 5/0403; B62D 7/20
See application file for complete search history.

(56) References Cited

U.S. PATENT DOCUMENTS

| | | | | | |
|---|---|---|---|---|---|
| 5,890,082 | A | * | 3/1999 | Ikegaya | ................... B62D 6/00 |
| | | | | | 180/413 |
| 2005/0172707 | A1 | * | 8/2005 | Kanatani | ............. B60C 23/0433 |
| | | | | | 73/146 |

(Continued)

FOREIGN PATENT DOCUMENTS

| | | |
|---|---|---|
| JP | 2010-184509 A | 8/2010 |
| JP | 2017-197073 A | 11/2017 |

*Primary Examiner* — Sizo B Vilakazi
(74) *Attorney, Agent, or Firm* — Sughrue Mion, PLLC

(57) ABSTRACT

An operation amount acquisition device in a rear wheel steering system including a steering rod, an actuator, and a control device configured to control a steering angle of a left rear wheel and/or a right rear wheel based on an operation amount of the actuator, the operation amount acquisition device including: an operation amount detecting device configured to detect the operation amount; an inclination-related value detecting portion configured to detect an inclination-related value related to an inclination of a front-rear direction axis of the vehicle with respect to a traveling direction thereof; and an operation amount correcting portion configured to correct, based on a detected inclination-related value, the operation amount detected in a state in which the steering angle of the left rear wheel and/or the right rear wheel is controlled by the control device based on the operation amount such that the vehicle is in a straight traveling state.

8 Claims, 12 Drawing Sheets

(56)                    References Cited

U.S. PATENT DOCUMENTS

2012/0059552  A1*    3/2012   Mori  ...................... B62D 17/00
                                                          701/49
2015/0298691  A1*   10/2015   Kodaira  ............... B60W 30/10
                                                          701/48
2018/0264905  A1*    9/2018   Kimura  .................. B62J 45/414

* cited by examiner

ACTUATOR ONE ROTATION → MOVEMENT AMOUNT OF STEERING ROD 0. 1mm→ REAR WHEEL STEERING ANGLE 0. 1°

ABSOLUTE ANGLE SENSOR : TOLERANCE ±0. 15mm （0. 15° ）

FIG.4

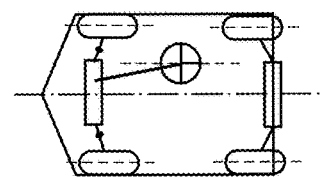

CORRECTION OF NUMBER OF ROTATIONS

| STRAIGHT-TRAVELING OPERATION ANGLE | 1.5° → 0.0° |
|---|---|
| NUMBER OF ROTATIONS | N → N-1 |

| STRAIGHT-TRAVELING OPERATION ANGLE | -1.5° → 0.0° |
|---|---|
| NUMBER OF ROTATIONS | N → N+1 |

COMPARISON OF STRAIGHT-TRAVELING OPERATION ANGLE

| STRAIGHT-TRAVELING OPERATION ANGLE | 1.5° |
|---|---|
| DATABASE | 0.0° |
| REAR WHEEL STEERING ANGLE | 0.1° |

| STRAIGHT-TRAVELING OPERATION ANGLE | 0.0° |
|---|---|
| DATABASE | 0.0° |
| REAR WHEEL STEERING ANGLE | 0.0° |

| STRAIGHT-TRAVELING OPERATION ANGLE | -1.5° |
|---|---|
| DATABASE | 0.0° |
| REAR WHEEL STEERING ANGLE | -0.1° |

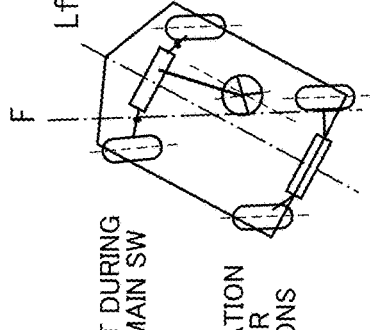

MOVEMENT DURING OFF OF MAIN SW

MISIDENTIFICATION OF NUMBER OF ROTATIONS

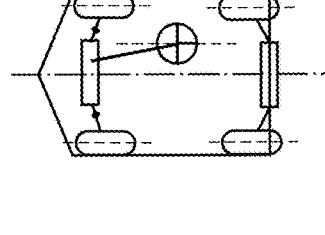

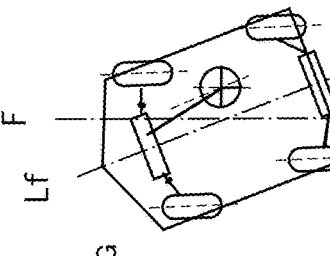

MOVEMENT DURING OFF OF MAIN SW

MISIDENTIFICATION OF NUMBER OF ROTATIONS

OPERATION AMOUNT ACQUISITION DEVICE

REFERENCE TO RELATED APPLICATION

This application claims priority from Japanese Patent Application No. 2023-198714 filed on Nov. 23, 2023. The entire content of the priority application is incorporated herein by reference.

TECHNICAL FIELD

The following disclosure relates to an operation amount acquisition device that acquires an operation amount of an actuator.

BACKGROUND ART

In a steering system described in Japanese Patent Application No. 2017-197073 (JP 2017-197073 A), when a difference between an actual yaw rate and a front wheel yaw rate is smaller than a set value or when a difference between the actual yaw rate and a rear wheel yaw rate is smaller than the set value, it is determined that the steering system is in a neutral state. Further, a deviation in the neutral state of the steering system between an estimated steering angle estimated based on a yaw rate and a detected steering angle detected by a steering angle sensor is stored. The set value is a value obtained by subtracting an error of a yaw rate sensor from a threshold value. The steering angle is an operation angle of a steering wheel.

SUMMARY

An aspect of the present disclosure relates to an operation amount acquisition device capable of favorably acquiring an operation amount of an actuator.

In the operation amount acquisition device according to the present disclosure, the operation amount is acquired based on a first physical quantity detected by a first physical quantity detecting device when a vehicle is traveling in a predetermined set state while the actuator is controlled based on the operation amount detected by an operation amount detecting device.

A change in the first physical quantity is large relative to a change in the operation amount. Thus, validity of the operation amount detected by the operation amount detecting device can be favorably acquired based on the first physical quantity when the vehicle is traveling in the set state. Accordingly, the operation amount can be favorably acquired by acquiring the operation amount based on the first physical quantity when the vehicle is traveling in the set state.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which:

FIG. 4 is a view conceptually showing a relationship in the rear wheel steering system between a steering angle of a right rear wheel and a left rear wheel and an operation amount of a steering operation member in a straight traveling state of a vehicle;

DESCRIPTION

Hereinafter, an operation amount acquisition device according to an embodiment of the present disclosure will be described with reference to the drawings. The operation amount acquisition device acquires an operation amount of an actuator included in a rear wheel steering system provided in a vehicle.

Figure 1:
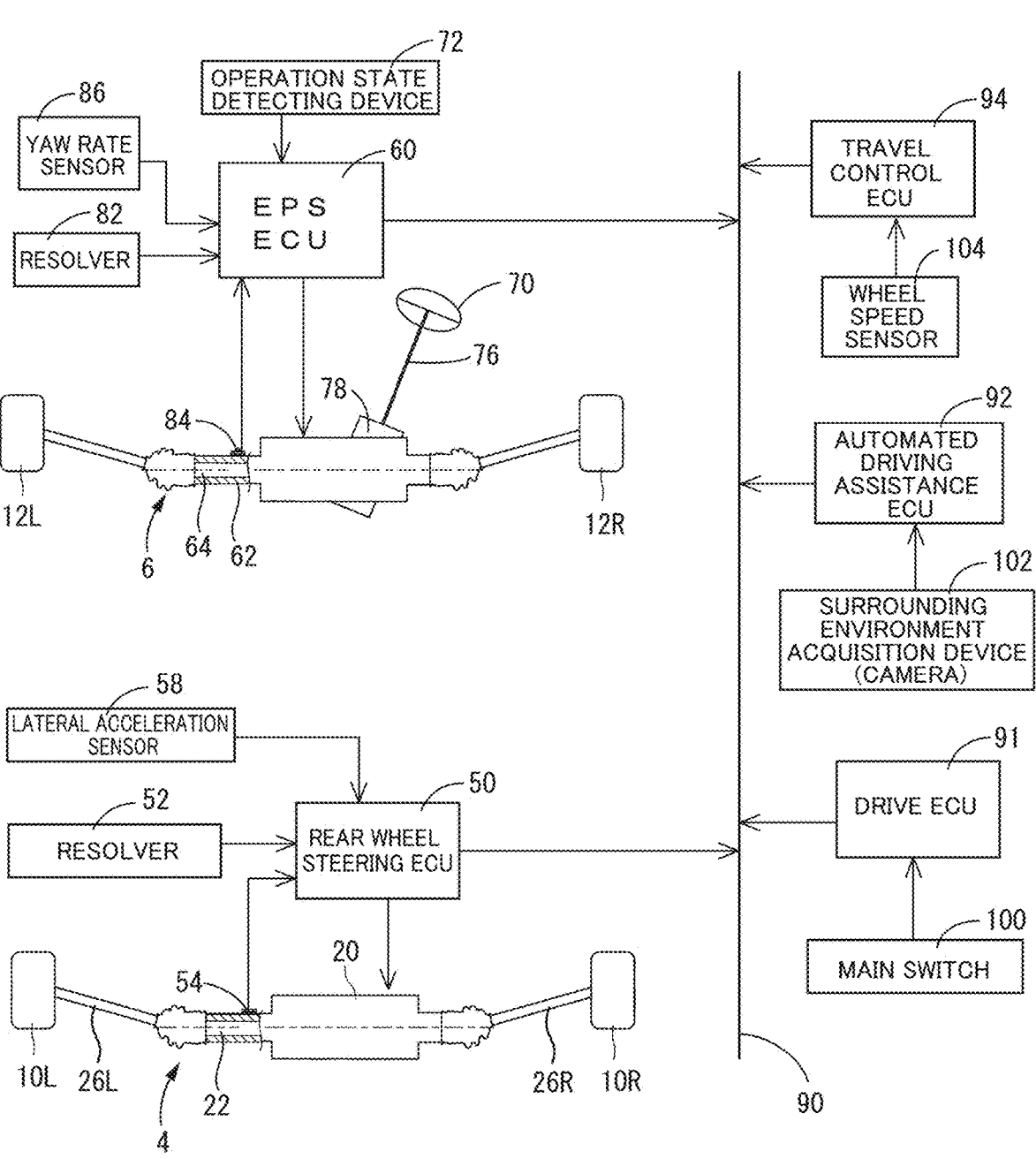
FIG. 1 is a view conceptually showing an entirety of an operation amount acquisition device according to one embodiment of the present disclosure.
Figure 2:
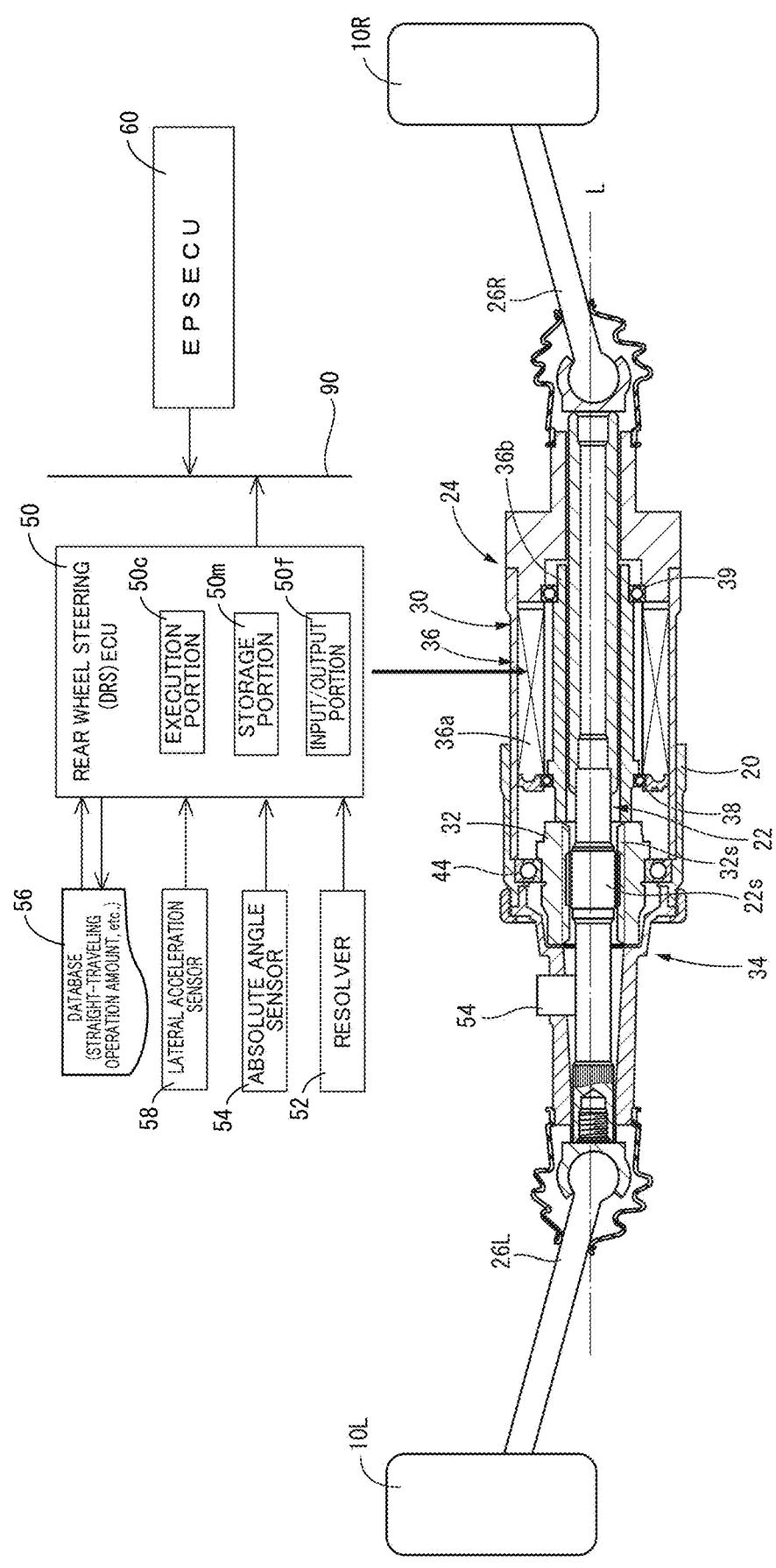
FIG. 2 is a view conceptually showing a rear wheel steering system including an in-vehicle device that is a constituent element of the operation amount acquisition device.

As shown in FIGS. 1 and 2, the vehicle includes a rear wheel steering (Dynamic Rear Steering) system 4, an electric power steering (EPS) system 6, and the like. The rear wheel steering system 4 steers a left rear wheel 10L and a right rear wheel 10R. The electric power steering system 6 steers a left front wheel 12L and a right front wheel 12R.

Hereinafter, the left rear wheel 10L and the right rear wheel 10R are abbreviated as left and right rear wheels 10L, 10R, and the left front wheel 12L and the right front wheel 12R are abbreviated as left and right front wheels 12L, 12R. The electric power steering system 6 is abbreviated as an EPS system 6.

The rear wheel steering system 4 includes a housing 20, a steering rod 22, a moving force applying device 24, and the like. The housing 20 extends in a width direction of the vehicle and is held by a vehicle body side member (not shown). The steering rod 22 extends in a direction parallel to an axis L. Tie rods 26L, 26R are respectively connected to opposite ends of the steering rod 22. The left and right rear wheels 10L, 10R are respectively connected to the tie rods 26L, 26R. The axis L extends in the width direction of the vehicle. Hereinafter, the direction parallel to the axis L is referred to as an axial direction.

The steering rod 22 is held by the housing 20 so as to be relatively movable in the axial direction and relatively unrotatable about the axis L. The steering rod 22 is held by the housing 20 through spline engagement, for instance. A male screw portion 22s is provided at an intermediate portion of the steering rod 22.

The moving force applying device 24 applies a moving force, which is a force in the axial direction, to the steering rod 22. The moving force applying device 24 includes an actuator 30, a nut member 32, a motion converting mechanism 34, and the like. The actuator 30 includes an electric motor 36 and the like. The electric motor 36 includes a stator 36a and a rotary shaft portion 36b. The nut member 32 is provided so as to be rotatable integrally with the rotary shaft portion 36b.

The stator 36a is fixed to the housing 20. A pair of bearings 38 and 39 are provided between the rotary shaft portion 36b and the housing 20. A bearing 44 is provided between the nut member 32 and the housing 20. As a result, the rotary shaft portion 36b and the nut member 32 are held by the housing 20 so as to be relatively immovable in the axial direction and relatively rotatable about the axis L relative to the housing 20. The rotary shaft portion 36b is provided radially inward of the stator 36a so as to extend in the axial direction. The rotary shaft portion 36b has a hollow shape, and the steering rod 22 penetrates through a central portion of the rotary shaft portion 36b. The male screw portion 22s of the steering rod 22 is screwed to a female screw portion 32s provided on an inner circumferential surface of the nut member 32.

The actuator 30 may include a speed reducer that reduces a rotational speed of the electric motor 36.

In the present embodiment, the motion converting mechanism 34 is constituted by the female screw portion 32s of the nut member 32, the male screw portion 22s of the steering rod 22, and the like.

In the steering system, when the nut member 32 is rotated by the actuator 30, the steering rod 22 is moved in the axial direction, and the left and right rear wheels 10L, 10R are steered via the tie rods 26L, 26R, respectively. In the present embodiment, when the steering rod 22 is located at a neutral position thereof, for example, the actuator 30 is located at a neutral position thereof. A steering angle of the left and right rear wheels 10L, 10R in this case is 0°. Further, a cumulative number of rotations of the actuator 30 (which will be referred to as a cumulative rotation number of the actuator 30 where appropriate) when the steering rod 22 is located at the neutral position is 0, and a displacement of the steering rod 22 from the neutral position is 0. Hereinafter, the steering angle of the left and right rear wheels 10L, 10R will be referred to as a rear wheel steering angle where appropriate. Similarly, a steering angle of the left and right front wheels 12L, 12R will be referred to as a front wheel steering angle where appropriate.

In the present embodiment, the cumulative rotation number of the actuator 30 from the neutral position, the displacement (movement amount) of the steering rod 22 from the neutral position, and the rear wheel steering angle correspond to each other on a one-to-one basis. In the rear wheel steering system 4 according to the present embodiment, it is assumed that the steering rod 22 is moved by 0.1 mm and the left and right rear wheels 10L, 10R are steered by 0.1° by one rotation of the actuator 30 (the nut member 32), for example.

The rear wheel steering system 4 is provided with a rear wheel steering Electronic Control Unit (ECU) 50 mainly composed of a computer. The rear wheel steering ECU 50 includes an execution portion 50c, a storage portion 50m, an input/output portion 50f, for example. A resolver 52, an absolute angle sensor 54, a database 56, a lateral acceleration sensor 58, and the like are connected to the input/output portion 50f.

The resolver 52 is one example of a rotation-number detecting device that detects the number of rotations of the actuator 30. In the present embodiment, the number of rotations detected by the resolver 52 is accumulated to obtain a cumulative rotation number Nc. The resolver 52 is capable of accurately detecting the number of rotations of the actuator 30. A tolerance of the resolver 52 is smaller than one rotation of the actuator 30. The tolerance refers to an allowable variation of a value detected by a sensor.

The absolute angle sensor 54 detects a position of the steering rod 22 relative to the housing 20. In the present embodiment, the absolute angle sensor 54 detects the displacement of the steering rod 22 from the neutral position. Though the neutral position of the steering rod 22 is acquired in advance before shipment of the vehicle, it is also acquired and learned after traveling. The displacement of the steering rod 22 from the neutral position will be referred to as a position of the steering rod 22 or a rod position.

Figure 3:
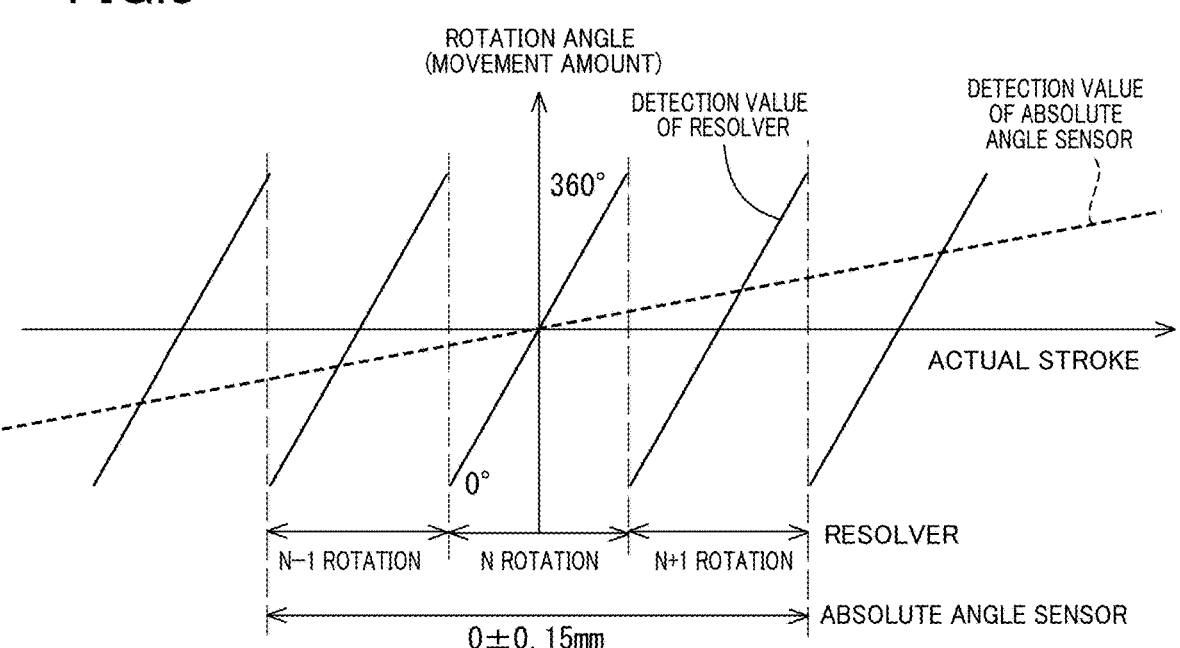
FIG. 3 is a view conceptually showing a relationship between the number of rotations of an actuator in the in-vehicle device of the rear wheel steering system and a change in a position of a steering rod.

As shown in FIG. 3, the absolute angle sensor 54 has low detection accuracy of the displacement of the steering rod 22 from the neutral position. A tolerance of the absolute angle sensor 54 is ±0.15 mm. It is thus difficult for the absolute angle sensor 54 to detect a change in the position of the steering rod 22 corresponding to one rotation of the actuator 30.

The database 56 may be connected to the rear wheel steering ECU 50 (i.e., externally attached) or may be built in the rear wheel steering ECU 50. The database 56 stores an OFF-time cumulative rotation number Ne, an OFF-time rod position Pe, a straight-traveling operation amount d, and the like. The OFF-time cumulative rotation number Ne is a cumulative rotation number when a main switch 100 is switched from ON to OFF. The OFF-time rod position Pe is the rod position when the main switch 100 is switched from ON to OFF. The OFF-time rod position Pe is acquired based on the OFF-time cumulative rotation number Ne. The straight-traveling operation amount d is an operation amount of a steering operation member 70 from its neutral position when the vehicle is traveling straight.

The lateral acceleration sensor 58 detects lateral acceleration that acts on the vehicle. When the vehicle travels straight on a flat road surface, the lateral acceleration is smaller than a set value. When the vehicle travels on an inclined road surface (cant), however, the lateral acceleration is larger than the set value even if the vehicle travels straight. Further, the lateral acceleration is larger than the set value also when the vehicle body is in a roll posture.

The EPS system 6 assists an operation force applied to the steering operation member 70 to steer the left and right front wheels 12L, 12R. The EPS system 6 applies an assist force corresponding to an operation amount θ of the steering operation member 70 from its neutral position. The operation amount θ of the steering operation member 70 from the neutral position is detected by an operation state detecting device 72. The steering operation member 70 is operable by a driver of the vehicle. The steering operation member 70 may be a steering wheel, for example, but is not limited to the steering wheel. In a case where the steering operation member 70 is the steering wheel, the operation amount may be referred to as an operation angle.

The EPS system 6 may include, for example, an electric power steering ECU 60, a housing 62, a steering rod 64, and a moving force applying device (not shown). The steering operation member 70 is connected to a steering shaft 76 and a gear box 78. The steering rod 64 is provided with a rack portion (not shown). The steering operation member 70 is engaged with the rack portion of the steering rod 64 in the gear box 78. Hereinafter, the electric power steering ECU 60 will be abbreviated as an EPS ECU 60.

The EPS ECU 60 includes a computer as a main component. The operation state detecting device 72, a resolver 82, an absolute angle sensor 84, a yaw rate sensor 86, and the like are connected to an input/output portion of the EPS ECU 60. The yaw rate sensor 86 detects a yaw rate. The yaw rate is a rotational speed around a vertical axis of the vehicle. When the yaw rate detected by the yaw rate sensor 86 is equal to or less than a set value, it can be estimated that the vehicle is in a straight traveling state.

In the present embodiment, when the steering operation member 70 is located at the neutral position, it is considered that the steering rod 64 is located at the neutral position and the front wheel steering angle is 0. Further, when the operation amount of the steering operation member 70 is 1.5°, the front wheel steering angle is considered to be approximately 0.1°.

In the present embodiment, when a state in which a detection value $\gamma$ of the yaw rate sensor 86 is smaller than a set value $\gamma$th continues for a set time or more, for example, it is determined that the vehicle is in the straight traveling state. The straight traveling state is one example of a set state. When the vehicle is in the straight traveling state, the operation amount $\theta$ of the steering operation member 70 is detected by the operation state detecting device 72 to acquire the straight-traveling operation amount d. The straight-traveling operation amount d is appropriately updated and learned.

Figure 9:
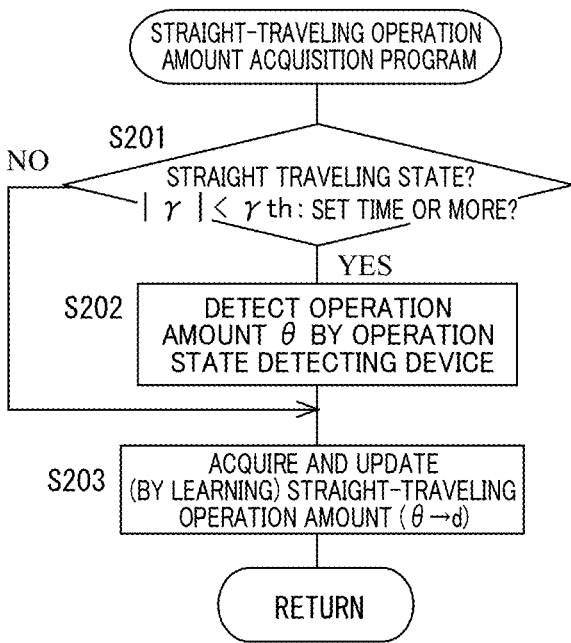
FIG. 9 is a flowchart showing a straight-traveling operation amount acquisition program stored in the storage portion of the operation amount acquisition device.

In the EPS ECU 60, a straight-traveling operation amount acquisition program represented by a flowchart of FIG. 9 is executed every set time when the vehicle is in a traveling state.

In Step 201, it is determined whether or not the vehicle is in the straight traveling state. (Hereinafter, Step 201 will be abbreviated as S201. The same applies to the other steps). If the determination is YES, the operation amount $\theta$ of the steering operation member 70 is detected by the operation state detecting device 72 in S202, and the straight-traveling operation amount d is acquired and stored by learning in S203.

A plurality of ECUs such as the rear wheel steering ECU 50 and the EPS ECU 60 are connected to each other via a controller area network (CAN) 90. A drive ECU 91, an automated driving assistance ECU 92, a travel control ECU 94, and the like are connected to the CAN 90. The automated driving assistance ECU 92 will be also referred to as an advanced driver-assistance system (ADAS) ECU 92. The rear wheel steering ECU 50, the EPS ECU 60, the drive ECU 91, the automated driving assistance ECU 92, the travel control ECU 94, and the like are communicable with each other.

The drive ECU 91 controls a drive device (not shown) of the vehicle. The main switch 100 and the like of the vehicle are connected to the drive ECU 91. Information indicating an ON or OFF state of the main switch 100 is supplied to the rear wheel steering ECU 50 and the like via the CAN 90. The main switch 100 may be, for example, an ignition switch.

The automated driving assistance ECU 92 assists traveling of the vehicle. The assistance of traveling of the vehicle includes assistance of driving of the vehicle. A surrounding environment acquisition device 102 and the like are connected to the automated driving assistance ECU 92. The surrounding environment acquisition device 102 acquires, for example, a surrounding object that is an object located around an own vehicle that is the vehicle, so as to acquire a relative positional relationship between the own vehicle and the surrounding object. The surrounding environment acquisition device 102 includes, for example, a camera. Information indicating the relative positional relationship between the own vehicle and the surrounding object is supplied to the rear wheel steering ECU 50 and the like via the CAN 90.

The travel control ECU 94 stabilizes traveling of the vehicle. Thus, the travel control ECU 94 may be referred to as a vehicle stability control ECU. Wheel speed sensors 104 are connected to the travel control ECU 94. The wheel speed sensors 104 are provided respectively for the left and right front wheels 12L, 12R and the left and right rear wheels 10L, 10R. Each wheel speed sensor 104 detects a rotational speed of a corresponding one of the left and right front wheels 12L, 12R and the left and right rear wheels 10L, 10R. Based on the detection values of the wheel speed sensors 104, a traveling speed v of the vehicle is detected. Information indicating the traveling speed v of the vehicle is supplied to the rear wheel steering ECU 50 and the like via the CAN 90.

An operation of the vehicle configured as described above will be described. The rear wheel steering ECU 50 determines a target rear wheel steering angle that is a target steering angle of the left and right rear wheels 10L, 10R. The target rear wheel steering angle may be determined based on the relative positional relationship between the surrounding object and the own vehicle or may be determined based on the operation amount $\theta$ of the steering operation member 70 and the traveling speed v of the vehicle, and the like. The target rear wheel steering angle may be determined to be in the same phase with respect to a target front wheel steering angle or may be determined to be in a reverse phase with respect to the target front wheel steering angle.

In the rear wheel steering ECU 50, while the main switch 100 is ON, the number of rotations of the actuator 30 is detected by the resolver 52 and the cumulative rotation number of the actuator 30 is acquired. The position of the steering rod 22 is acquired based on the cumulative rotation number of the actuator 30, and the rear wheel steering angle is acquired. Then, the actuator 30 is controlled such that the acquired rear wheel steering angle approaches the target rear wheel steering angle.

On the other hand, while the main switch 100 is OFF, the number of rotations of the actuator 30 is not detected by the resolver 52. Thus, the OFF-time cumulative rotation number Ne, which is the cumulative rotation number when the main switch 100 is switched from ON to OFF, is stored in the database 56, for example. As described above, the OFF-time rod position Pe is also stored in the database 56. Next, when the main switch 100 is switched from OFF to ON, counting of the cumulative rotation number of the actuator 30 is considered to be started by setting the OFF-time cumulative rotation number Ne as a count start value Ncf.

$$Ne \rightarrow Ncf$$

However, when an external force is applied to the vehicle body while the main switch 100 is OFF and the actuator 30 is in a stopped state, for example, the steering rod 22 may be moved in the rear wheel steering system 4. This may be expressed as the steering rod 22 being "moved" or a "movement" of the steering rod 22 being caused.

For example, there are considered a case in which a large force is applied to a rear portion of the vehicle body and a case in which vibration occurs due to the vehicle being carried by a carrier car and the operation of the steering operation member 70 is locked. In these cases, the steering rod 22 may be moved in the rear wheel steering system 4 while the steering rod 64 is hardly moved in the EPS system 6.

When the "movement" is caused as described above, an actual cumulative rotation number of the actuator 30 at the time when the main switch 100 is turned to ON is different from the OFF-time cumulative rotation number Ne. Therefore, if the OFF-time cumulative rotation number Ne is set as the count start value Ncf, the cumulative rotation number of the actuator 30 is different from the actual cumulative rotation number. The rear wheel steering angle cannot be accurately acquired, and it is difficult to accurately control the rear wheel steering angle.

Therefore, when the main switch 100 is switched from OFF to ON, the position of the steered rod 22 is detected by the absolute angle sensor 54, and the detected rod position is defined as an ON-time rod position Ps. It is then determined whether or not an absolute value |Pe−Ps| of a difference between the OFF-time rod position Pe and the ON-time rod position Ps is larger than a determination threshold value ΔPth. When the absolute value |Pe−Ps| of the difference is larger than the determination threshold value ΔPth, it is determined that the "movement" has been caused in a time period during which the main switch 100 is OFF. The determination threshold ΔPth may be a value by which the steering rod 22 can be considered to have been moved by an external force. The determination threshold ΔPth is one example of a second threshold.

In the case where the "movement" has been caused in the time period during which the main switch 100 is OFF, the steering rod 22 is considered to be located at the ON-time rod position Ps when the main switch 100 is switched from OFF to ON. Therefore, based on the ON-time rod position Ps, a cumulative rotation number Ns is acquired and is set as an ON-time cumulative rotation number Ns. Then, the ON-time cumulative rotation number Ns is set as the count start value Ncf.

$$Ns \rightarrow Ncf$$

Then, the cumulative rotation number of the actuator 30 is counted from the count start value Ncf. This can be considered that the cumulative rotation number Ne of the actuator 30 is corrected based on the detection value of the absolute angle sensor 54.

Figure 5:
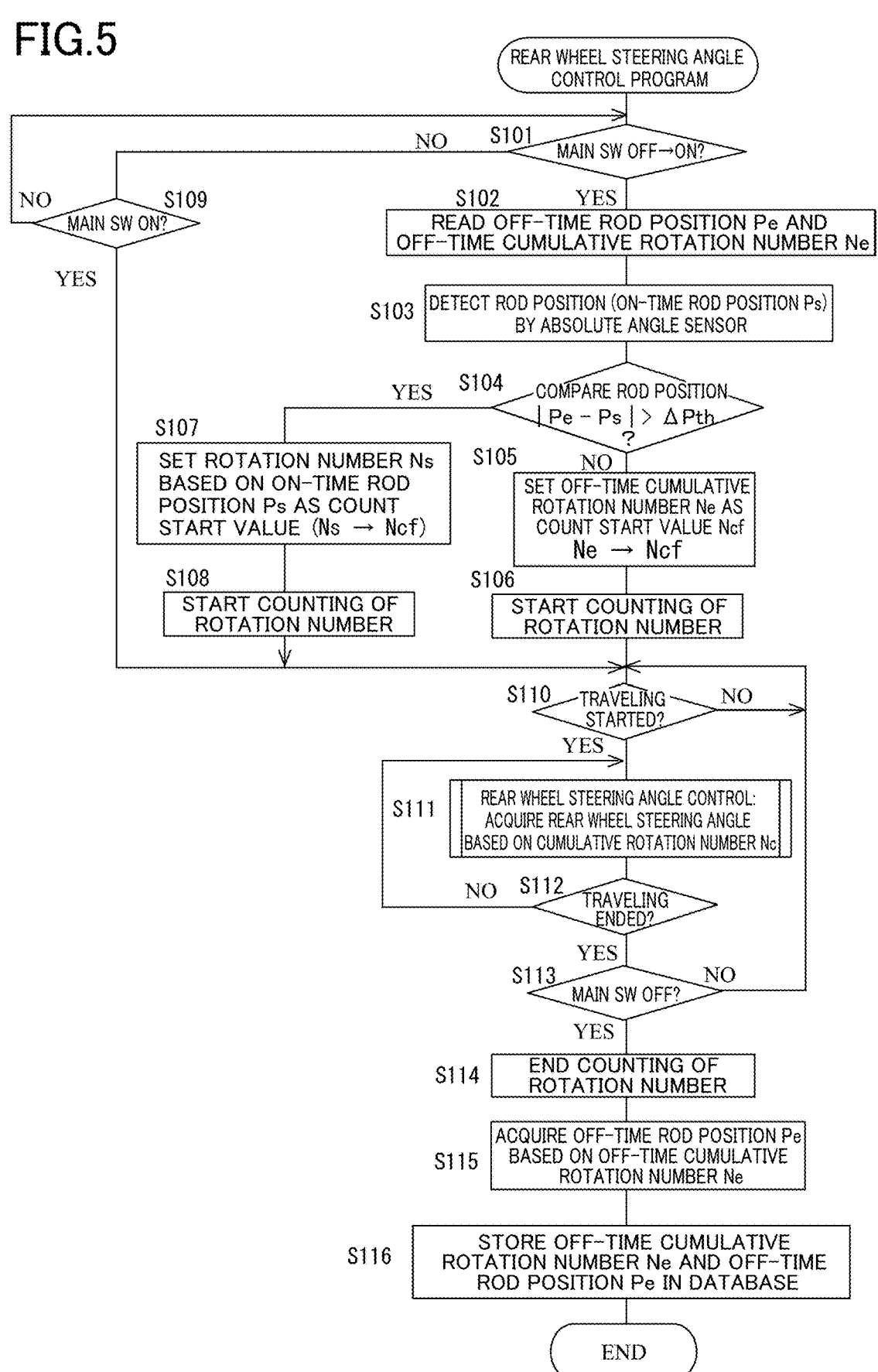
FIG. 5 is a flowchart showing a rear wheel steering angle control program stored in a storage portion of the rear wheel steering system.

In the rear wheel steering ECU 50, a rear wheel steering angle control program represented by a flowchart of FIG. 5 is executed every set time.

In S101, it is determined whether or not the main switch 100 is switched from OFF to ON. When the determination is YES, S102-S108 are executed.

In S102, the OFF-time cumulative rotation number Ne and the OFF-time rod position Pe are read from the database 56. In S103, the ON-time rod position Ps is detected by the absolute angle sensor 54. In S104, it is determined whether or not the absolute value |Pe−Ps| of the difference is larger than the determination threshold value ΔPth. When the determination is NO, the OFF-time cumulative rotation number Ne is set as the count start value Ncf in S105, and the counting of the cumulative rotation number Nc is started from the count start value Ncf in S106.

When the determination in S104 is YES, on the other hand, the control flow proceeds to S107 in which the ON-time cumulative rotation number Ns is determined based on the ON-time rod position Ps and the ON-time cumulative rotation number Ns is set as the count start value Ncf. In S108, the counting of the cumulative rotation number of the actuator 30 is started from the count start value Ncf.

When the determination in S101 is NO, it is determined in S109 whether or not the main switch 100 is in the ON state. When the determination in S101 is NO and the determination in S109 is YES, S110 and subsequent steps are executed without executing S102-S108.

Next, it is determined in S110 whether or not the vehicle is started to travel. When the determination is YES, the rear wheel steering angle is controlled in S111. The position of the steering rod 22 is acquired based on the cumulative rotation number Nc, and the rear wheel steering angle is acquired. Then, the actuator 30 is controlled such that the rear wheel steering angle approaches the target rear wheel steering angle.

In S112, it is determined whether or not the traveling of the vehicle is ended. In S113, it is determined whether or not the main switch 100 is turned to OFF. When the determination in S112 is NO, S111 is repeatedly executed. When the determination in S113 is NO, S110-S113 are repeatedly executed. When the determinations in S112 and S113 are YES, S114-S116 are executed.

In S114, the counting of the cumulative rotation number Nc is ended. In S115, the OFF-time cumulative rotation number Ne is acquired, and the OFF-time rod position Pe is acquired. In S116, these are stored in the database 56.

Since the tolerance of the absolute angle sensor 54 is large as described above, however, it is difficult to accurately detect a displacement of the steering rod 22 by an amount of 0.15 mm or less. Even if the cumulative rotation number is corrected based on the detection value of the absolute angle sensor 54, the corrected cumulative rotation number may be different from the actual cumulative rotation number. It is difficult to accurately control the rear wheel steering angle.

Even if the rear wheel steering angle is controlled to be 0° and the front wheel steering angle is controlled to be 0°, for example, the rear wheel steering angle may not be 0° even though the front wheel steering angle is controlled to be 0°. In this case, when straight traveling is desired, the steering operation member 70 is operated, and the left and right front wheels 12L, 12R are also steered.

In a case where the front wheel steering angle and the rear wheel steering angle are equal to each other, the vehicle performs deflected traveling, as shown in FIG. 4. The deflected traveling refers to straight traveling in a state in which an axis Lf extending in the front-rear direction of the vehicle body is inclined with respect to a traveling direction F of the vehicle, as shown in FIG. 4. Since the vehicle travels straight in the direction of the wheels 10L, 10R, 12L, 12R, the traveling direction of the vehicle is F. In the deflected traveling, on the other hand, the axis Lf extending in the front-rear direction of the vehicle body is inclined with respect to the traveling direction F. The axis Lf extending in the front-rear direction of the vehicle body is referred to as a front-rear direction axis.

It is apparent from the above that the straight-traveling operation amount d, which is the operation amount of the steering operation member 70, is larger when the rear wheel steering angle is large than when the rear wheel steering angle is small. Further, the front wheel steering angle can be acquired based on the straight-traveling operation amount d, and the rear wheel steering angle can be similarly acquired.

In the present embodiment, the rear wheel steering angle is acquired based on the operation amount (the straight-traveling operation amount d) of the steering operation member 70 in a state in which the rear wheel steering angle is controlled such that the vehicle travels straight. Based on the rear wheel steering angle, the actual cumulative rotation number of the actuator 30 is acquired, and the cumulative rotation number is corrected. In the present embodiment, the cumulative rotation number Nc of the actuator 30 is corrected based on the straight-traveling operation amount d.

In a case where the steering operation member 70 is a steering wheel, the steering wheel 70 can be rotated from a neutral position thereof by about 360° to 540° in one direction. Even in a case where the steering operation member 70 is not the steering wheel, a maximum operation amount of the steering operation member 70 to one side is usually larger than a maximum steering angle of the left and right rear wheels 10L, 10R to one direction. The operation state detecting device 72 can accurately detect 1.5°, which is the operation amount of the steering operation member 70. The operation state detecting device 72 has a tolerance smaller than ±1.5°.

From the above, in a case where the straight-traveling operation amount d is ±1.5°, for example, it can be estimated that the left and right front wheels 12L, 12R and the left and right rear wheels 10L, 10R are steered by ±0.1°. This causes a difference corresponding to ±1 rotation of the cumulative rotation number Nc of the actuator 30 in the rear wheel steering system 4. Thus, in the case where the straight-traveling operation amount d is ±1.5°, the cumulative rotation number Nc is corrected by ±1.

The numerical values such as 0.1°, 1.5°, and 0.1 mm are described by way of example in the present description, and the values are not limited to those described above. By changing specifications of the rear wheel steering system 4 and the EPS system 6, these numerical values also change.

In the present embodiment, an absolute value |d−dm| of a difference between the straight-traveling operation amount d detected when the main switch 100 is ON this time and the straight-traveling operation amount dm stored in the database 56 when the main switch 100 is ON last time is acquired. Then, it is determined whether or not the absolute value |d−dm| of the difference between the straight-traveling operation amounts is larger than a first threshold value dth, and it is determined whether or not a movement amount conversion value ΔPd is smaller than a third threshold value δ. The movement amount conversion value ΔPd is a value acquired by converting the absolute value |d−dm| of the difference into the movement amount of the steering rod 22.

When the absolute value |d−dm| of the difference is larger than the first threshold dth and the movement amount conversion value ΔPd is smaller than the third threshold δ, the cumulative rotation number Nc is corrected based on the straight-traveling operation amount dm.

$$|d{-}dm|{>}dth$$

$$\Delta Pd{<}\delta$$

The first threshold value dth is set to a value by which the vehicle can be considered to be in a state of deflected traveling, i.e., a deflected traveling state. The straight-traveling operation amount dm stored in the database 56 is considered to be substantially 0°. On the other hand, an absolute value of the straight-traveling operation amount d is large when the vehicle is in the deflected traveling state this time. The third threshold value δ is set to a value determined based on the tolerance of the absolute angle sensor 54. When the main switch 100 is switched from OFF to ON, a difference equal to or larger than the tolerance of the absolute angle sensor 54 has already been corrected.

Therefore, the reason why the difference equal to or larger than the tolerance of the absolute angle sensor 54 is generated again is that the reliability of the value of the straight-traveling operation amount d is considered to be low.

Figure 6:
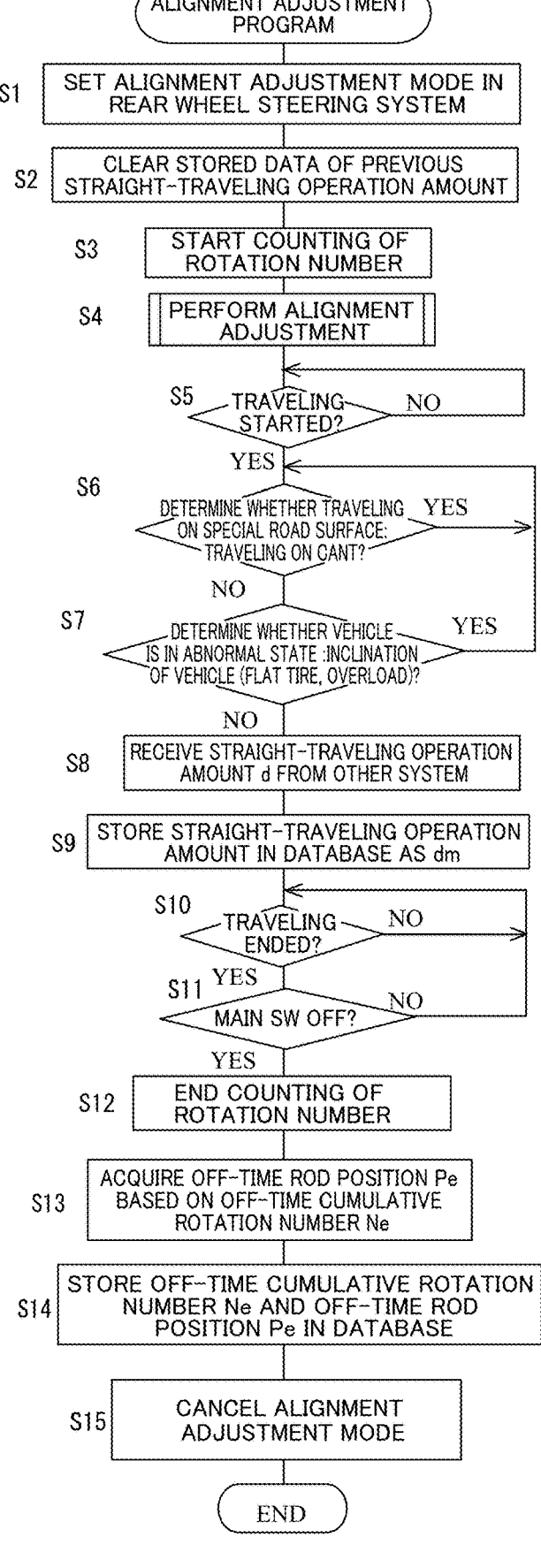
FIG. 6 is a flowchart showing an alignment adjustment program stored in a storage portion of the operation amount acquisition device.

At the time of shipment of the vehicle, at the time of inspection of the vehicle, etc., an alignment adjustment program represented by a flowchart of FIG. 6 is executed. The alignment adjustment is performed for both the left and right front wheels 12L, 12R and the left and right rear wheels 10L, 10R.

In S1, an alignment adjustment mode is set in the rear wheel steering system 4. In S2, data such as the straight-traveling operation amount d stored in the database 56 is deleted. In S3, the counting of the cumulative rotation number of the actuator 30 is started. In S4, the alignment adjustment is performed.

It is then determined in S5 whether or not the vehicle is started to travel. Based on the lateral acceleration detected by the lateral acceleration sensor 58, it is determined in S6 whether or not a road surface is a special road surface such as a cant, and it is determined in S7 whether or not there is a circumstance in which the vehicle is in a roll posture, for instance. This is because there is a high possibility that the operation amount θ of the steering operation member 70 in the straight traveling state of the vehicle does not accurately reflect the rear wheel steering angle when the lateral acceleration is greater than a set value even if the vehicle is in the straight traveling state. When the road surface on which the vehicle travels is not the special road surface and the inclination of the vehicle in the lateral direction is small, the determinations in S6 and S7 are NO. When the determinations in S6 and S7 are NO, the straight-traveling operation amount d is received in S8 and stored in the database 56 in S9.

In the present embodiment, when the vehicle is in the straight traveling state and the vehicle is not inclined, information indicating the straight-traveling operation amount d supplied from the EPS ECU 60 is received, and the information is stored and updated in the database 56.

It is determined in S10 whether or not the traveling of the vehicle is ended. It is determined in S11 whether or not the main switch 100 is turned to OFF. When the straight-traveling operation amount d is acquired once from the start of traveling to the end of traveling, S10 and S11 are repeatedly executed until the determinations in S10 and S11 become YES. On the other hand, when the straight-traveling operation amount d is acquired a plurality of times, S5-S11 may be repeatedly executed while the determinations in S10 and S11 are NO.

When the determinations in S10 and S11 are YES, the counting of the rotation number is ended in S12. In S13, the OFF-time cumulative rotation number Ne and the OFF-time rod position Pe are acquired. In S14, the OFF-time cumulative rotation number Ne and the OFF-time rod position Pe are stored in the database 56. Thereafter, the alignment adjustment mode is canceled in S15.

Figure 7:
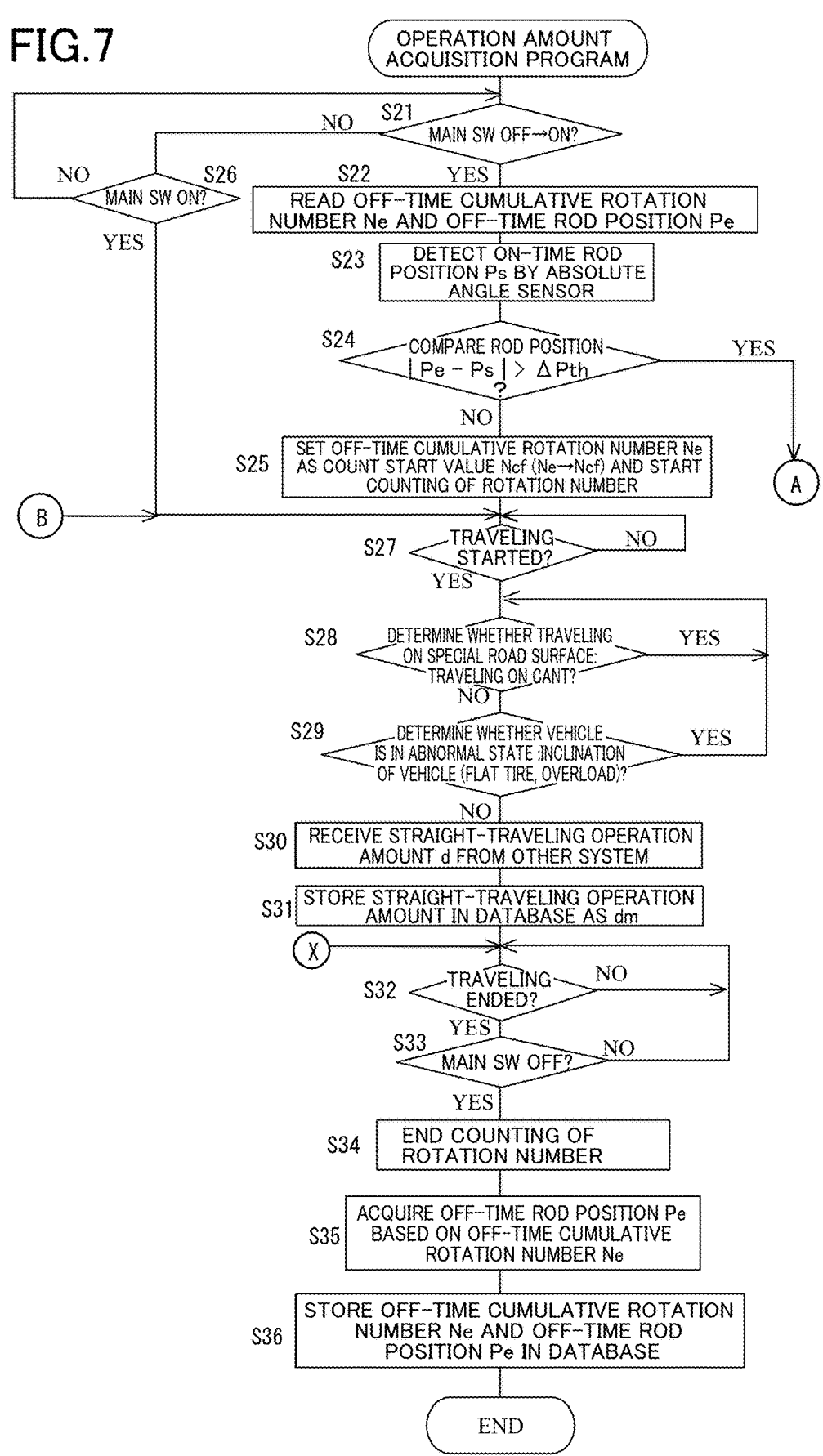
FIG. 7 is a flowchart showing a part of an operation amount acquisition program stored in the storage portion of the operation amount acquisition device.
Figure 8:
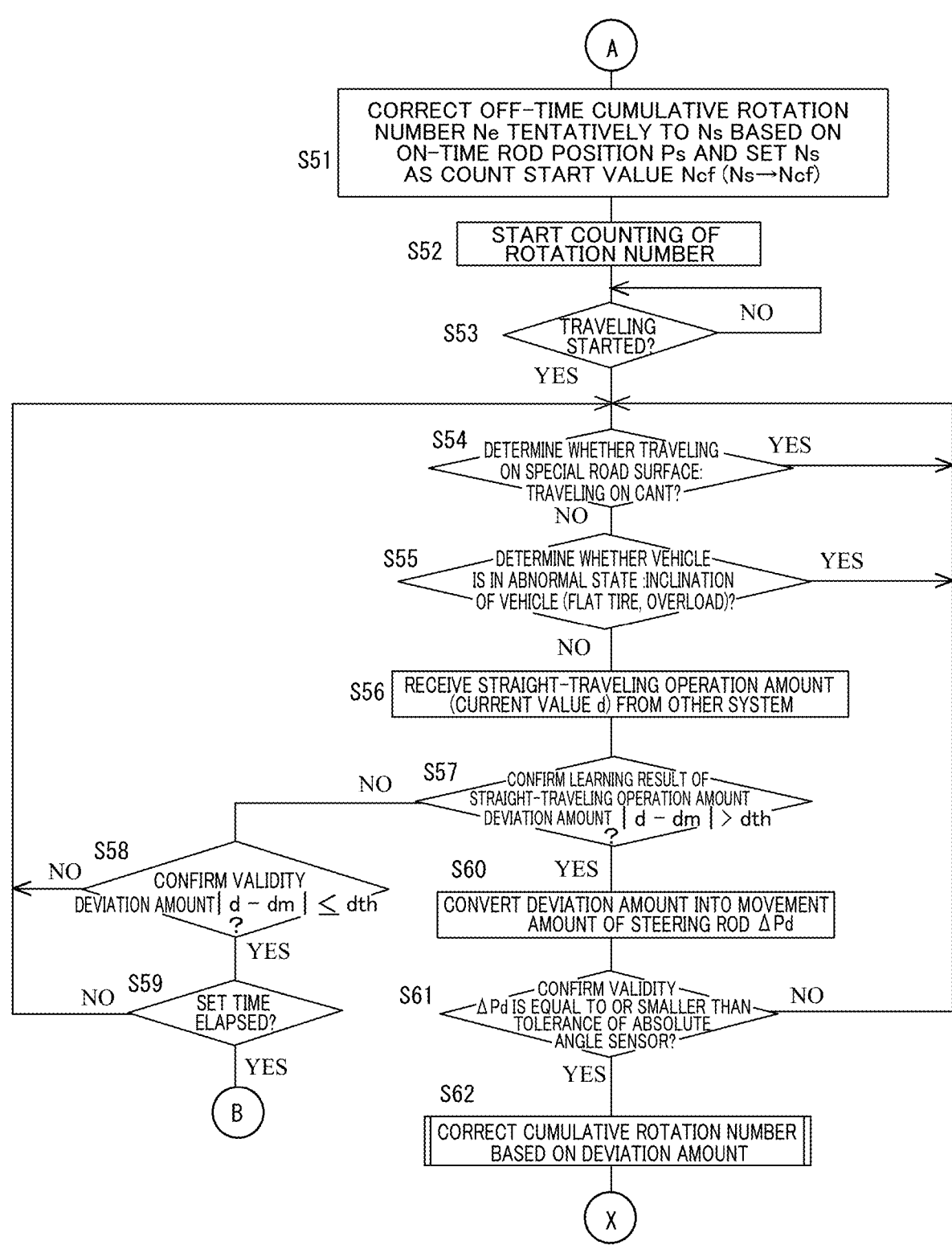
FIG. 8 is a flowchart showing another part of the operation amount acquisition program.

In the rear wheel steering ECU 50, an operation amount acquisition program represented by flowcharts of FIGS. 7 and 8 is executed every set time. In S21, it is determined whether or not the main switch 100 is switched from OFF to ON. When the determination is YES, the OFF-time cumulative rotation number Ne and the OFF-time rod position Pe are read in S22. In S23, the ON-time rod position Ps is detected by the absolute angle sensor 54. In S24, it is determined whether or not the absolute value of the difference between the OFF-time rod position Pe and the ON-time rod position Ps is larger than the determination threshold value ΔPth. When the determination in S24 is YES, S51 and subsequent steps are executed. When the determination in S24 is NO, the OFF-time cumulative rotation number Ne is set as the count start value Ncf in S25, and the counting of the rotation number of the actuator 30 is started.

When the determination in S21 is NO, it is determined in S26 whether or not the main switch 100 is ON. When the determination is YES, S27 and subsequent steps are executed without executing S22-S25.

In S27-S36, processing similar to that in S5-S14 of the alignment adjustment program is executed. In the rear wheel steering ECU 50, S27-S31 are executed while the rear wheel steering angle control program represented by the flowchart of FIG. 5 is executed. In a case where the vehicle is not inclined after the start of traveling, the straight-traveling operation amount d supplied from the EPS ECU 60 is stored in the database 56.

When the traveling is ended and the main switch 100 is turned to OFF, the counting of the rotation number is ended in S34. In this step, the rear wheel steering control is also ended. The OFF-time cumulative rotation number Ne and the OFF-time rod position Pe are acquired in S35 and are stored in the database 56 in S36.

On the other hand, when the determination in S24 is YES, S51 is executed to acquire the ON-time cumulative rotation number Ns based on the ON-time rod position Ps and to set the ON-time cumulative rotation number Ns as the count start value Ncf. Then, the counting of the cumulative rotation number of the actuator 30 is started from the count start value Ncf in S52. When the traveling is started and the determination in S53 becomes YES, the rear wheel steering ECU 50 controls the rear wheel steering angle based on the cumulative rotation number Nc counted in S52, and S54 and subsequent steps are executed.

In S54 and S55, it is determined whether or not the vehicle is inclined based on the lateral acceleration. When the determinations in S54 and S55 are NO, the control flow proceeds to S56 in which the straight-traveling operation amount d acquired when the main switch 100 is ON this time is supplied from the EPS system 6 via the CAN 90. In S57, it is determined whether or not the absolute value |d−dm| of the difference between the straight-traveling operation amount d and the straight-traveling operation amount dm stored in the database 56 (the previous value of the straight-traveling operation amount) is larger than the first threshold value dth. When the determination is NO, it is determined in S58 and S59 whether or not a state in which the absolute value |d−dm| of the difference is equal to or less than the first threshold dth has continued for a set time or more. When S59 is executed for the first time, the determination result is NO. However, when S54-S59 are repeatedly executed and the set time elapses, the determination in S59 may be YES. When the determination in S59 is YES, it is determined that the correction based on the ON-time rod position Ps is appropriate, and the control flow returns to S27 in FIG. 7. Then, the current straight-traveling operation amount d is acquired and stored in the database 56.

On the other hand, when the determination in S57 is YES, the control flow proceeds to S60 in which a value ΔPd acquired by converting the absolute value |d−dm| of the difference into the movement amount of the steering rod 22 is acquired. In S61, it is determined whether or not the conversion value ΔPd is equal to or smaller than the third threshold value δ. When the determination is YES, the cumulative rotation number Ne is corrected in S62 based on the straight-traveling operation amount d. In the present embodiment, the cumulative rotation number Nc is often corrected by ±1.

In S62, the actual position of the steering rod 22 is also changed in accordance with the correction of the cumulative rotation number Nc. The steering rod 22 is moved such that the rod position corresponding to the corrected cumulative rotation number Nc matches the rod position detected by the absolute angle sensor 54.

Figure 10A:
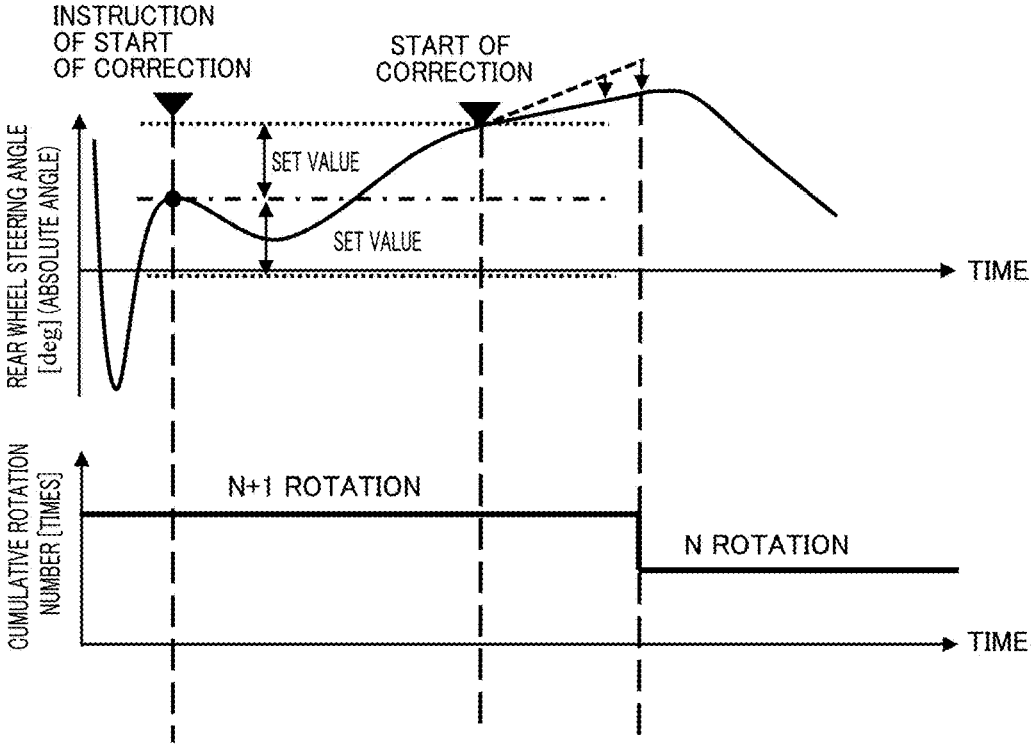
FIG. 10A is a view showing one form in which the position of the steering rod is adjusted during rear wheel steering angle control in the rear wheel steering system.
Figure 10B:
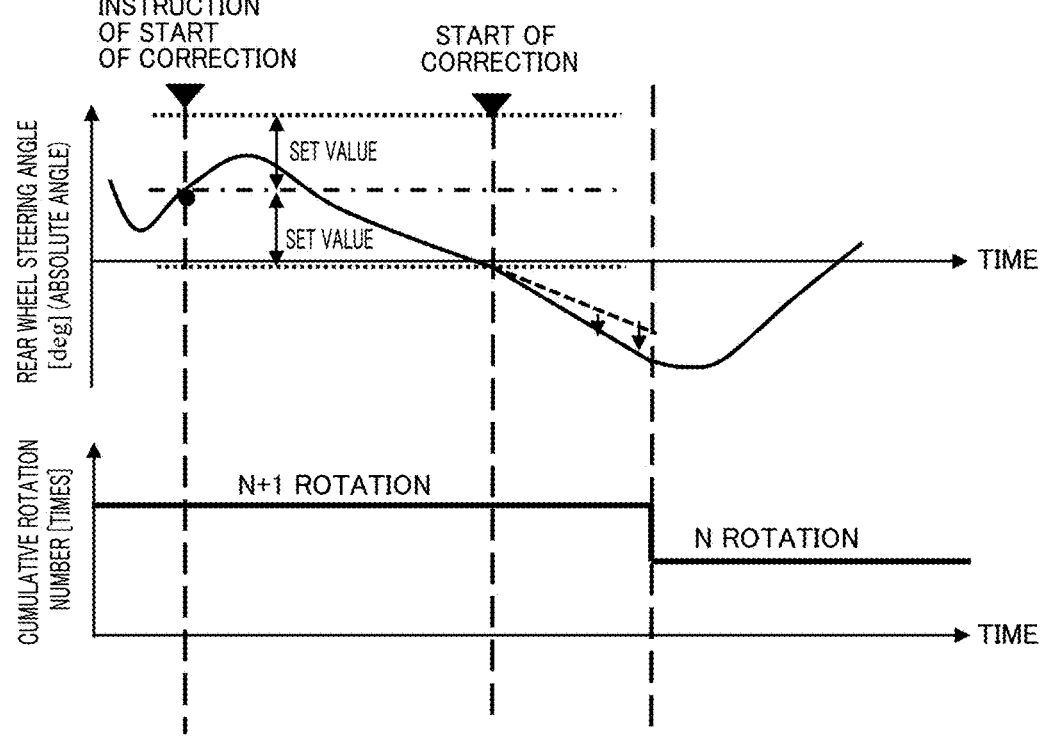
FIG. 10B is a view showing one form in which the position of the steering rod is adjusted during the rear wheel steering angle control in the rear wheel steering system.
Figure 11A:
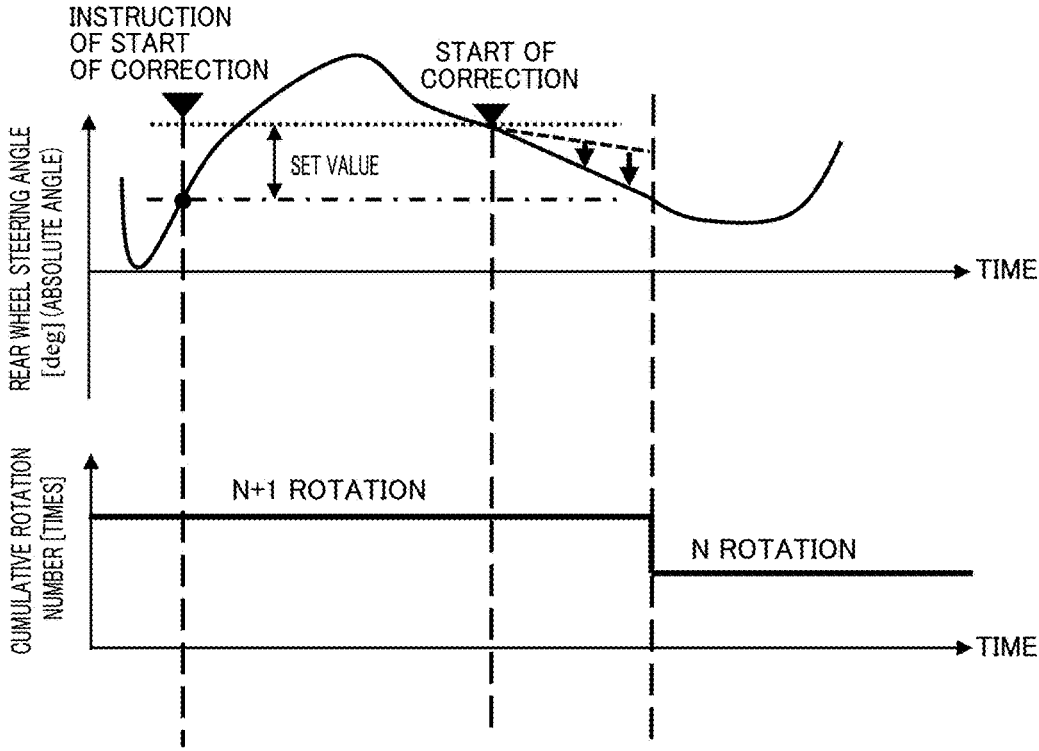
FIG. 11A is a view showing another form different from those shown in FIGS. 10A and 10B.
Figure 11B:
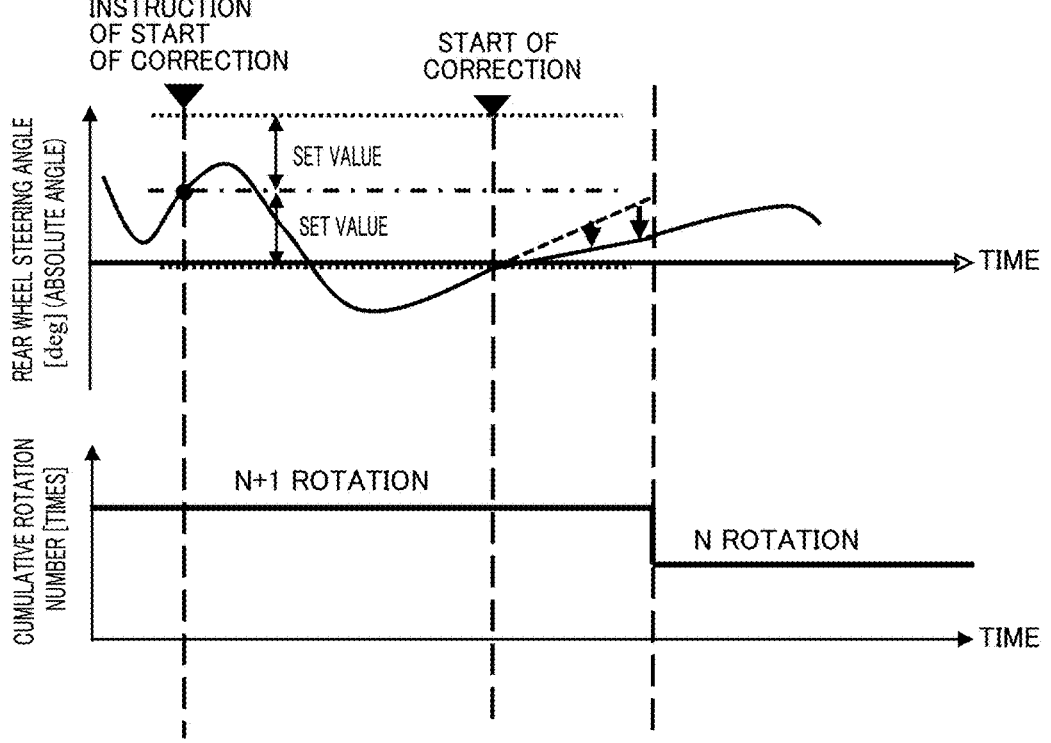
FIG. 11B is a view showing another form different from those shown in FIGS. 10A and 10B.

During the control of the rear wheel steering angle, a range is assumed which is determined by the control value of the rear wheel steering angle at the time when the start of the correction is instructed and the set value. As shown in FIG. 10, the steering rod 22 may be slowly moved, triggered by a change of the control value of the rear wheel steering angle from a value within the range to a value outside the range. Further, as shown in FIG. 11, the steering rod 22 may be slowly moved, triggered by a change of the control value of the rear wheel steering angle from a value outside the range to a value within the range.

This makes it possible to move the steering rod 22 while reducing an uncomfortable feeling of the driver. In addition, the relationship between the detection value of the absolute angle sensor 54 and the cumulative rotation number Nc can be favorably maintained.

After execution of S62, S32 and subsequent steps are executed.

When the determination in S61 is NO, on the other hand, it is determined that the reliability of the straight-traveling operation amount d is low, and the control flow returns to S54. The straight-traveling operation amount d is acquired again. When the determination in S61 becomes YES by repeated execution of S54-S60, S62 is executed, and S32-S36 are executed.

As described above, in the present embodiment, the presence or absence of the "movement" of the steering rod 22 in the time period during which the main switch 100 is OFF is determined based on the detection value of the absolute angle sensor 54. When it is determined that the "movement" has been caused, the cumulative rotation number is corrected based on the ON-time rod position detected by the absolute angle sensor 54 when the main switch 100 is turned to ON. As a result, it is possible to suppress a decrease in the control accuracy of the rear wheel steering angle in spite of the "movement".

Further, during the control of the rear wheel steering angle, the cumulative rotation number Nc is corrected based on the straight-traveling operation amount d in a situation in which the rear wheel steering angle is not 0° and the vehicle is in the deflected traveling state. It is thus possible to correct the cumulative rotation number Nc of the actuator 30 even for a part of the cumulative rotation number that cannot be corrected based on the detection value of the absolute angle sensor 54. As a result, the control accuracy of the rear wheel steering angle is favorably prevented from being decreased.

Figure 12:
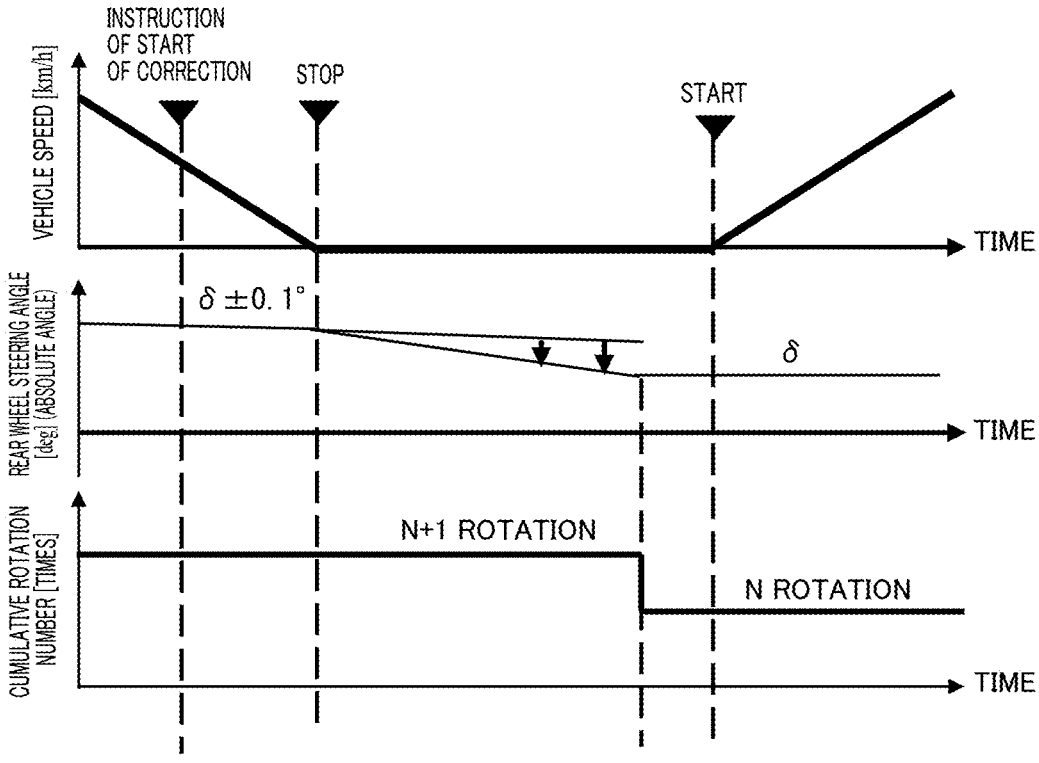
FIG. 12 is a view showing adjustment of the position of the steering rod in a stopped state of the vehicle.

The position of the steering rod 22 can be corrected in a stopped state of the vehicle. In this case, the steering rod 22 is forcibly moved in the stopped state of the vehicle, as shown in FIG. 12. It is considered that the driver feels less uncomfortable even if the steering rod 22 is forcibly moved in the stopped state of the vehicle.

The illustrated embodiment exemplifies a case in which the straight-traveling operation amount d is supplied from the EPS ECU 60 to the rear wheel steering ECU 50. The present disclosure may be embodied otherwise. For example, in a case where the rear wheel steering system 4 and the EPS system 6 are combined to constitute a vehicle steering system, both the learning of the straight-traveling operation amount d and the correction of the cumulative rotation number Nc are executed in the vehicle steering system.

The straight-traveling operation amount d is also acquired by the automated driving assistance ECU 92 and the travel control ECU 94. Therefore, the straight-traveling operation amount d may be supplied from the automated driving assistance ECU 92 and the travel control ECU 94 to the rear wheel steering ECU 50.

The fact that the vehicle is in the deflected traveling state may be acquired with a camera included in the surrounding environment acquisition device 102. For example, it can be acquired based on a change in the captured images on the axis of the camera. The camera is provided at a front central portion of the vehicle so as to face forward.

When the vehicle is traveling straight and the traveling direction F of the vehicle coincides with the front-rear direction axis Lf, the captured images of the same object should always be located on a reference area of the camera. On the other hand, when the vehicle is in the deflected traveling state and the front-rear direction axis Lf is inclined with respect to the traveling direction F, the captured images of the same object are located at respective portions apart from the reference area of the camera. Based on this, it is possible to acquire: the fact that the vehicle is in the deflected traveling state; and the inclination of the front-rear direction axis Lf of the vehicle with respect to the traveling direction F of the vehicle.

Further, the fact that the vehicle is in the deflected traveling state may be acquired based on each of positions detected by respective two position detection devices (such as GPS receivers) provided apart from each other in the width direction of the vehicle or each of movement trajectories or the like that is based on a change in each of the positions.

The actuator 30 may include a speed reducer. Further, the in-vehicle device is not limited to the rear wheel steering system or the constituent elements thereof. Further, the set state is not limited to the straight traveling state but may be a turning traveling state, for example.

As described above, in the present embodiment, the rear wheel steering ECU 50, the resolver 52, the absolute angle sensor 54, the lateral acceleration sensor 58, the EPS ECU 60, the operation state detecting device 72, the yaw rate sensor 86, and the like constitute an operation amount acquisition device.

The straight-traveling operation amount d of the steering operation member 70 is one example of an inclination-related value that is the inclination of the front-rear direction axis Lf with respect to the traveling direction F of the vehicle. The moving force applying device 24 or the rear wheel steering system 4 corresponds to the in-vehicle device. The cumulative rotation number of the actuator 30 corresponds to the operation amount, and the resolver 52 and the like constitute an operation amount detecting device. Further, the straight-traveling operation amount d of the steering operation member 70 corresponds to a first physical quantity, and the operation state detecting device 72 corresponds to a first physical quantity detecting device and an inclination-related value detecting portion. The position of the steering rod 22 corresponds to a second physical quantity, and the absolute angle sensor 54 corresponds to a second physical quantity detecting device and a rod position detecting portion. The OFF-time rod position Pe corresponds to an OFF-time second physical quantity, and the ON-time rod position Ps corresponds to an ON-time second physical quantity and a detected rod position. The detected inclination-related value corresponds to a current value d of the straight-traveling operation amount, and the reference inclination-related value corresponds to the straight-traveling operation amount dm stored in the database 56.

The rear wheel steering ECU 50 and the like constitute a control device. A portion of the control device that stores S21-S62, a portion of the control device that executes S21-S62, and the like constitute an operation amount correcting portion. A portion of the control device that stores S24, a portion of the control device that executes S24, and the like constitute a movement determining portion.

In addition, the present disclosure may be implemented in various forms with various modifications and improvements based on the knowledge of those skilled in the art.

Claimable Invention

There will be described various forms of the claimable invention.

(1) An operation amount acquisition device configured to acquire an operation amount of an actuator in a rear wheel steering system, the rear wheel steering system including a steering rod extending in a width direction of a vehicle and the actuator capable of moving the steering rod in the width direction, the rear wheel steering system being configured to steer at least one of a left rear wheel and a right rear wheel of the vehicle connected to the steering rod by causing the actuator to move the steering rod in the width direction, wherein the rear wheel steering system includes a control device configured to control a steering angle of the at least one of the left rear wheel and the right rear wheel based on the operation amount of the actuator, and wherein the operation amount acquisition device includes: an operation amount detecting device configured to detect the operation amount of the actuator; an inclination-related value detecting portion configured to detect an inclination-related value that is related to an inclination of a front-rear direction axis of the vehicle with respect to a traveling direction of the vehicle; and an operation amount correcting portion configured to correct, based on a detected inclination-related value that is the inclination-related value detected by the inclination-related value detecting portion, the operation amount of the actuator detected by the operation amount detecting device in a state in which the steering angle of the at least one of the left rear wheel and the right rear wheel is controlled by the control device based on the operation amount of the actuator detected by the operation amount detecting device such that the vehicle is in a straight traveling state.

The inclination-related value is the inclination of the front-rear direction axis of the vehicle with respect to the traveling direction of the vehicle or a value corresponding to the inclination on a one-to-one basis. When the rear wheel steering angle is controlled such that the vehicle is in the straight traveling state, the target rear wheel steering angle is often made equal to 0°.

(2) The operation amount acquisition device according to the form (1), wherein the operation amount correcting portion corrects the operation amount of the actuator based on the detected inclination-related value when an absolute value of a difference between the detected inclination-related value and a reference inclination-related value is larger than a first threshold value, the reference inclination-related value being the inclination-related value in the straight traveling state of the vehicle acquired and stored in advance.

The reference inclination-related value may be, for example, an inclination-related value acquired when the main switch was ON in the past. The reference inclination-related value is a value when the vehicle is not in the deflected traveling state. Therefore, the first threshold value may be a value by which the vehicle can be considered to be in the deflected traveling state.

(3) The operation amount acquisition device according to the form (1) or (2), wherein the rear wheel steering system includes a rod position detecting portion configured to detect a position of the steering rod that is a displacement of the steering rod from a neutral position of the steering rod, and wherein the operation amount correcting portion corrects the operation amount of the actuator based on an ON-time rod position when an absolute value of a difference between an OFF-time rod position and the ON-time rod position is larger than a second threshold value, the OFF-time rod position being the position of the steering rod acquired based on the operation amount of the actuator detected by the operation amount detecting device when a main switch of the vehicle is switched from ON to OFF, the ON-time rod position being the position of the steering rod detected by the rod position detecting portion when the main switch is switched from OFF to ON.

The second threshold value may be a value by which it can be determined that the steering rod has been moved. Further, the second threshold value is desirably a value equal to or larger than a tolerance of the rod position detecting portion.

(4) The operation amount acquisition device according to the form (3), wherein the operation amount correcting portion corrects, based on the detected inclination-related value, a corrected operation amount that is the operation amount of the actuator corrected based on the ON-time rod position when (A) an absolute value of a difference between the detected inclination-related value and a reference inclination-related value is larger than a first threshold value and (B) a value acquired by converting the absolute value of the difference between the detected inclination-related value and the reference inclination-related value into a movement amount of the steering rod is smaller than a third threshold value, the detected inclination-related value being detected by the inclination-related value detecting portion in a state in which the steering angle of the at least one of the left rear wheel and the right rear wheel is controlled by the control device based on the corrected operation amount such that the vehicle is in the straight traveling state, the reference inclination-related value being the inclination-related value in the straight traveling state of the vehicle acquired and stored in advance.

The third threshold value may be a value determined based on the tolerance of the rod position detecting portion. The corrected operation amount corresponds to the cumulative rotation number that starts to be counted by execution of S107 and S108 in the illustrated embodiment.

(5) The operation amount acquisition device according to any one of the forms (1)-(4), wherein the rear wheel steering system includes a rod position detecting portion configured to detect a position of the steering rod that is a displacement of the steering rod from a neutral position of the steering rod, and wherein the operation amount acquisition device includes a movement determining portion that determines that the steering rod has been moved by an external force in a time period during which a main switch of the vehicle is OFF when an absolute value of a difference between an OFF-time rod position and an ON-time rod position is larger than a second threshold value, the OFF-time rod position being the position of the steering rod acquired based on the operation amount of the actuator detected by the operation amount detecting device when the main switch is switched from ON to OFF, the ON-time rod position being the position of the steering rod detected by the rod position detecting portion when the main switch is switched from OFF to ON.

(6) The operation amount acquisition device according to any one of the forms (1)-(5), wherein the actuator includes a motor, and wherein the operation amount detecting device detects the number of rotations of the actuator to acquire the cumulative number of rotations of the actuator from a neutral position of the actuator.

(7) The operation amount acquisition device according to any one of the forms (1)-(6), wherein the inclination-related value detecting portion detects, as the inclination-related value, at least one of (a) an operation amount of a steering operation member provided in the vehicle from a neutral position of the steering operation member; and (b) an inclination of an axis of a camera with respect to the traveling direction of the vehicle, the camera being mounted on the vehicle so as to be capable of capturing images ahead of the vehicle.

(8) The operation amount acquisition device according to any one of the forms (1)-(7), wherein the rear wheel steering system includes a rod position detecting portion configured to detect a position of the steering rod that is a displacement of the steering rod from a neutral position of the steering rod, and wherein a change amount of the inclination-related value that changes in accordance with a change in a set operation change amount of the operation amount of the actuator is larger than a tolerance of the inclination-related value detecting portion, and a movement amount of the steering rod that changes in accordance with the change in the set operation change amount of the operation amount is smaller than a tolerance of the rod position detecting portion.

The above form is a basic requirement representing the performance of each detecting portion. The set operation change amount may be, for example, the set rotation number of the actuator. In the illustrated embodiment, the set rotation number is 1.

(9) A steering system, including: a steering rod extending in a width direction of a vehicle and connected to a wheel; an actuator capable of moving the steering rod in the width direction; an operation amount detecting device configured to detect an operation amount of the actuator; a rod position detecting portion configured to detect a position of the steering rod that is a displacement of the steering rod from a neutral position of the steering rod; and an operation amount correcting portion that corrects the operation amount based on an ON-time rod position when an absolute value of a difference between an OFF-time rod position and the ON-time rod position is larger than a second threshold value, the OFF-time rod position being the position of the steering rod acquired based on the operation amount when a main switch of the vehicle is switched from ON to OFF, the ON-time rod position being the position of the steering rod detected by the rod position detecting portion when the main switch is switched from OFF to ON.

The steering system according to this form may employ the features described in any one of the forms (1)-(8).

(10) A steering system, including: a steering rod extending in a width direction of a vehicle and connected to a wheel; an actuator capable of moving the steering rod in the width direction; an operation amount detecting device configured to detect an operation amount of the actuator; a rod position detecting portion configured to detect a position of the steering rod that is a displacement of the steering rod from a neutral position of the steering rod; and a movement determining portion that determines that the steering rod has been moved in the width direction by an external force in a time period during which a main switch of the vehicle is OFF when an absolute value of a difference between an OFF-time rod position and an ON-time rod position is larger than a second threshold value, the OFF-time rod position being the position of the steering rod acquired based on the operation amount when the main switch is switched from ON to OFF, the ON-time rod position being the position of the steering rod detected by the rod position detecting portion when the main switch is switched from OFF to ON.

The steering system according to this form may employ the features described in any one of the forms (1)-(9).

(11) An operation amount acquisition device, including: an operation amount detecting device configured to detect an operation amount of an actuator of an in-vehicle device mounted on a vehicle; a first physical quantity detecting device configured to detect a first physical quantity that is a physical quantity corresponding to the operation amount on a one-to-one basis; and an operation amount correcting portion configured to correct the operation amount based on the first physical quantity detected by the first physical quantity detecting device, wherein the operation amount correcting portion corrects the operation amount of the actuator based on a value detected by the first physical quantity detecting device when the vehicle is traveling in a predetermined set state while the actuator is controlled based on the operation amount detected by the operation amount detecting device.

One example of the first physical quantity detecting device is the inclination-related value detecting portion, and one example of the set state of the vehicle is the straight traveling state of the vehicle. One example of the in-vehicle device is the rear wheel steering system or the constituent elements of the rear wheel steering system. The first physical quantity detecting device and the in-vehicle device are not limited to those in the illustrated embodiment.

The operation amount acquisition device of this form may employ the technical features described in any one of the forms (1)-(10).

(12) The operation amount acquisition device according to the form (11), further including a second physical quantity detecting device that is different from the first physical quantity detecting device and that is configured to detect a second physical quantity different from the first physical quantity and corresponding to the operation amount on a one-to-one basis, wherein the operation amount correcting portion does not correct the operation amount based on a second detection value when an absolute value of a difference between a second conversion value and the second detection value is smaller than a fourth threshold value, and the operation amount correcting portion corrects the operation amount based on the second detection value when the absolute value of the difference is equal to or larger than the fourth threshold value, the second conversion value being a value acquired by converting the operation amount detected by the operation amount detecting device into the second physical quantity, the second detection value being a value detected by the second physical quantity detecting device.

In the illustrated embodiment, the second detection value corresponds to the ON-time rod position Ps, and the second conversion value corresponds to the OFF-time rod position Pe. The fourth threshold value corresponds to the second threshold value.

(13) The operation amount acquisition device according to the form (11) or (12), wherein the operation amount correcting portion determines that a first detection value is abnormal when a differential second conversion value is equal to or larger than a fifth threshold value, and the operation amount correcting portion corrects, based on the first detection value, a corrected operation amount corrected based on the second detection value when the differential second conversion value is smaller than the fifth threshold value, the differential second conversion value being a value acquired by converting, into the second physical quantity, an absolute value of a difference between the first detection value and a first reference value, the first detection value being a value detected by the first physical quantity detecting device when the vehicle is traveling in the set state while the in-vehicle device is controlled based on the corrected operation amount, the first reference value being the first physical quantity in traveling of the vehicle in the set state acquired and stored in advance.

The fifth threshold value corresponds to the third threshold value.

What is claimed is:

1. An operation amount acquisition device configured to acquire an operation amount of an actuator in a rear wheel steering system, the rear wheel steering system including a steering rod extending in a width direction of a vehicle and the actuator capable of moving the steering rod in the width direction, the rear wheel steering system being configured to steer at least one of a left rear wheel and a right rear wheel of the vehicle connected to the steering rod by causing the actuator to move the steering rod in the width direction, wherein the rear wheel steering system includes a control device configured to control a steering angle of the at least one of the left rear wheel and the right rear wheel based on the operation amount of the actuator, and wherein the operation amount acquisition device includes:

an operation amount detecting device configured to detect the operation amount of the actuator;

an inclination-related value detecting portion configured to detect an inclination-related value that is related to an inclination of a front-rear direction axis of the vehicle with respect to a traveling direction of the vehicle; and an operation amount correcting portion configured to correct, based on a detected inclination-related value that is the inclination-related value detected by the inclination-related value detecting portion, the operation amount of the actuator detected by the operation amount detecting device in a state in which the steering angle of the at least one of the left rear wheel and the right rear wheel is controlled by the control device based on the operation amount detecting device such that the vehicle is in a straight traveling state.

2. The operation amount acquisition device according to claim 1, wherein the operation amount correcting portion corrects the operation amount of the actuator based on the detected inclination-related value when an absolute value of a difference between the detected inclination-related value and a reference inclination-related value is larger than a first threshold value, the reference inclination-related value being the inclination-related value in the straight traveling state of the vehicle acquired and stored in advance.

3. The operation amount acquisition device according to claim 1, wherein the rear wheel steering system includes a rod position detecting portion configured to detect a position of the steering rod that is a displacement of the steering rod from a neutral position of the steering rod, and wherein the operation amount correcting portion corrects the operation amount of the actuator based on an ON-time rod position when an absolute value of a difference between an OFF-time rod position and the ON-time rod position is larger than a second threshold value, the OFF-time rod position being the position of the steering rod acquired based on the operation amount of the actuator detected by the operation amount detecting device when a main switch of the vehicle is switched from ON to OFF, the ON-time rod position being the position of the steering rod detected by the rod position detecting portion when the main switch is switched from OFF to ON.

4. The operation amount acquisition device according to claim 3, wherein the operation amount correcting portion corrects, based on the detected inclination-related value, a corrected operation amount that is the operation amount of the actuator corrected based on the ON-time rod position when (A) an absolute value of a difference between the detected inclination-related value and a reference inclination-related value is larger than a first threshold value and (B) a value acquired by converting the absolute value of the difference between the detected inclination-related value and the reference inclination-related value into a movement amount of the steering rod is smaller than a third threshold value, the detected inclination-related value being detected by the inclination-related value detecting portion in a state in which the steering angle of the at least one of the left rear wheel and the right rear wheel is controlled by the control device based on the corrected operation amount such that the vehicle is in the straight traveling state, the reference inclination-related value being the inclination-related value in the straight traveling state of the vehicle acquired and stored in advance.

5. The operation amount acquisition device according to claim 1, wherein the rear wheel steering system includes a rod position detecting portion configured to detect a position of the steering rod that is a displacement of the steering rod from a neutral position of the steering rod, and wherein the operation amount acquisition device includes a movement determining portion that determines that the steering rod has been moved by an external force in a time period during which a main switch of the vehicle is OFF when an absolute value of a difference between an OFF-time rod position and an ON-time rod position is larger than a second threshold value, the OFF-time rod position being the position of the steering rod acquired based on the operation amount of the actuator detected by the operation amount detecting device when the main switch is switched from ON to OFF, the ON-time rod position being the position of the steering rod detected by the rod position detecting portion when the main switch is switched from OFF to ON.

6. The operation amount acquisition device according to claim 1, wherein the inclination-related value detecting portion detects, as the inclination-related value, at least one of (a) an operation amount of a steering operation member provided in the vehicle from a neutral position of the steering operation member; and (b) an inclination of an axis of a camera with respect to the traveling direction of the vehicle, the camera being mounted on the vehicle so as to be capable of capturing images ahead of the vehicle.

7. A steering system, comprising:

a steering rod extending in a width direction of a vehicle and connected to a wheel;

an actuator capable of moving the steering rod in the width direction;

an operation amount detecting device configured to detect an operation amount of the actuator;

a rod position detecting portion configured to detect a position of the steering rod that is a displacement of the steering rod from a neutral position of the steering rod; and an operation amount correcting portion that corrects the operation amount based on an ON-time rod position when an absolute value of a difference between an OFF-time rod position and the ON-time rod position is larger than a second threshold value, the OFF-time rod position being the position of the steering rod acquired based on the operation amount when a main switch of the vehicle is switched from ON to OFF, the ON-time rod position being the position of the steering rod detected by the rod position detecting portion when the main switch is switched from OFF to ON.

8. A steering system, comprising:

a steering rod extending in a width direction of a vehicle and connected to a wheel;

an actuator capable of moving the steering rod in the width direction;

an operation amount detecting device configured to detect an operation amount of the actuator;

a rod position detecting portion configured to detect a position of the steering rod that is a displacement of the steering rod from a neutral position of the steering rod; and a movement determining portion that determines that the steering rod has been moved in the width direction by an external force in a time period during which a main switch of the vehicle is OFF when an absolute value of a difference between an OFF-time rod position and an ON-time rod position is larger than a second threshold value, the OFF-time rod position being the position of the steering rod acquired based on the operation amount when the main switch is switched from ON to OFF, the ON-time rod position being the position of the steering rod detected by the rod position detecting portion when the main switch is switched from OFF to ON.

* * * * *